US008749110B2

(12) United States Patent
Wong et al.

(10) Patent No.: US 8,749,110 B2
(45) Date of Patent: Jun. 10, 2014

(54) PERMANENT MAGNET MOTOR (75) Inventors: Ben To Fan Wong, Hong Kong (CN); Hong Wei Zhang, Shenzhen (CN); Tian Jun Liao, Shenzhen (CN)

(73) Assignee: Johnson Electric S.A., Murten (CH)

( * ) Notice: Subject to any disclaimer, the term of this patent is extended or adjusted under 35 U.S.C. 154(b) by 262 days.

(21) Appl. No.: 12/964,498

(22) Filed: Dec. 9, 2010

(65) Prior Publication Data
US 2011/0140554 A1   Jun. 16, 2011

(30) Foreign Application Priority Data

Dec. 11, 2009   (CN) .......................... 2009 1 0188901

(51) Int. Cl.
*H02K 5/14* (2006.01)
*H02K 5/04* (2006.01)
*H02K 11/02* (2006.01)
*H02K 13/00* (2006.01)

(52) U.S. Cl.
USPC .............. 310/238; 310/68 B; 310/72; 310/89; 310/154.22; 310/405

(58) Field of Classification Search
USPC .......................... 310/154.01, 154.03–154.19, 310/154.21–154.25, 400–417, 426
See application file for complete search history.

(56) References Cited

U.S. PATENT DOCUMENTS

| 4,453,097 | A  | * | 6/1984 | Lordo ....................... 310/154.07 |
| 5,446,328 | A  | * | 8/1995 | Suzuki et al. ................. 310/233 |
| 5,977,671 | A  | * | 11/1999 | Kim ................................ 310/89 |
| 6,515,389 | B1 | * | 2/2003 | Hartz ........................ 310/154.08 |
| 7,109,616 | B2 | * | 9/2006 | Grzywacz et al. ........... 310/68 B |
| 2007/0007838 | A1 | * | 1/2007 | Kuroda ..................... 310/154.21 |
| 2009/0243425 | A1 | * | 10/2009 | Omori et al. .................. 310/239 |
| 2010/0231072 | A1 |   | 9/2010 | Qin et al. |

FOREIGN PATENT DOCUMENTS

JP          2009165209 A  *  7/2009

* cited by examiner

*Primary Examiner* — Burton Mullins
*Assistant Examiner* — Eric Johnson
(74) *Attorney, Agent, or Firm* — Muncy, Geissler, Olds & Lowe, P.C.

(57) ABSTRACT

A permanent magnet motor has a stator and a rotor rotatably mounted to the stator. The stator has a housing with n side portions and n connecting portions distributed alternately, wherein n is a integer equal to or greater than 3. Adjacent side portions are interconnected by one of the connecting portions. The radial cross section of each side portion is a convex curved line which is curved outwardly relative to a straight line passing through the two ends of the convex curve line. Permanent magnets are fixed to an inner surface of the housing. An end cap fixed to one end of the housing, has a bottom and n side walls extending from the bottom. A flat mounting surface is formed at the outer surface of a first one of the side walls.

19 Claims, 7 Drawing Sheets

PERMANENT MAGNET MOTOR

CROSS REFERENCE TO RELATED APPLICATIONS

This non-provisional patent application claims priority under 35 U.S.C. §119(a) from Patent Application No. 200910188901.7 filed in The People's Republic of China on Dec. 11, 2009.

FIELD OF THE INVENTION

This invention relates to a permanent magnet motor, and in particular to a miniature permanent magnet direct current (PMDC) motor, such as a motor for vehicle door lock system or a vehicle lift gate system.

BACKGROUND OF THE INVENTION

The size of a PMDC motor is a very critical factor in some applications. There is a desire for a smaller motor having equal or increased performance. In other words, there is a desire for a motor having a higher power density. U.S. published patent application No. US-2010-0231072-A1 discloses a PMDC motor having increased power density compared with a traditional flat sided motor. The motor comprises a housing made of steel and having four side portions and four connecting portions. Adjacent side portions are connected by a corresponding connecting portion. Magnets are fixed to the connecting portions. The radial cross section of each side portion is like a convex curved line, which is curved outwardly relative to a straight line passing through the two ends of the convex curve line. Compared to a traditional motor with two flat sides, this motor has increased power density and lower noise according to finite element analysis (FEA) test. However, the housing with curved side portions makes it not easy to install the motor.

Therefore, there is a desire for an improved motor that is easy to install and has equivalent or higher power density.

SUMMARY OF THE INVENTION

Accordingly, in one aspect thereof, the present invention provides a permanent magnet motor comprising a stator and a rotor rotatably mounted to the stator, the stator comprising a housing having n side portions and n connecting portions distributed alternately, wherein n is an integer equal to or greater than 3, adjacent side portions being connected by a respective one of the connecting portions; the radial cross section of each side portion being a convex curved line which is curved outwardly relative to a straight line passing through the two ends of the convex curved line; permanent magnets fixed to an inner surface of the housing; and an end cap mounted to one end of the housing, the end cap comprising a bottom and n side walls extending from the bottom, wherein one flat mounting surface is formed at the outer surface of a first one of said side walls.

Preferably, n is 4.

Preferably, the entire outer surface of said first side wall forms the flat mounting surface.

Preferably, a part of the outer surface of the first side wall forms the flat mounting surface and the flat mounting surface is substantially parallel to the plane containing two axial edges of said first side wall.

Preferably, the convex curved line includes a straight line segment and an arc segment.

Preferably, the rotor comprises a shaft, a commutator, a rotor core fixed onto the shaft and rotor windings wound about the rotor core; and the end cap supports a first brush and a second brush for sliding contact with the commutator, a first terminal and a second terminal for connecting to a power supply and electrically connected to respective brushes, and a thermistor electrically connected in series between the first brush and the first terminal for over current protection.

Preferably, the end cap supports a chip capacitor that is electrically connect to the first terminal and the second terminal.

Preferably, the end cap supports a first choke and a second choke, the first choke being electrically connected in series with the first brush, the thermistor and the first terminal, the second choke being electrically connected in series with the second brush and the second terminal.

Preferably, the motor comprises a cup-shaped cover mounted to the end cap in the axial direction of the motor.

Preferably, the cover comprises a bottom and a side wall having a flat mounting surface, the flat mounting surface of the cover being aligned with the flat mounting surface of the end cap.

Preferably, the motor comprises a printed circuit board mounted inside the cover.

Preferably, the motor comprise a position magnet fixed onto the shaft, the position magnet being outside the end cap and received in the cover; the motor comprises at least one Hall sensor received in the cover for detecting the magnetic field of the position magnet.

Preferably, the motor comprise a position magnet fixed onto the shaft, the position magnet being outside the end cap and received in the cover; the motor comprises at least one Hall sensor mounted to the printed circuit board for detecting the magnetic field of the position magnet.

Preferably, the cover is fixed to the end cap by resilient fingers integrally formed as a part of the cover and disposed in recesses in the end cap.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
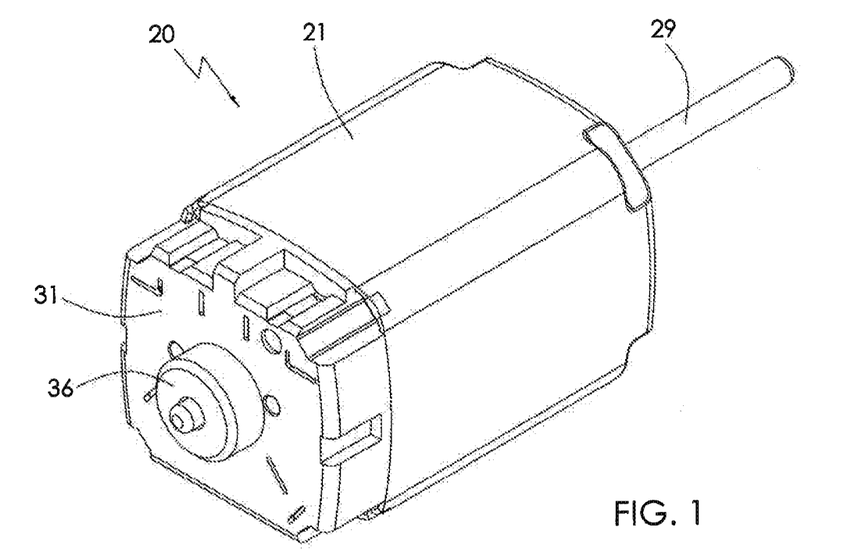
FIG. 1 shows a PMDC motor according to a first embodiment of the present invention.
Figure 2:
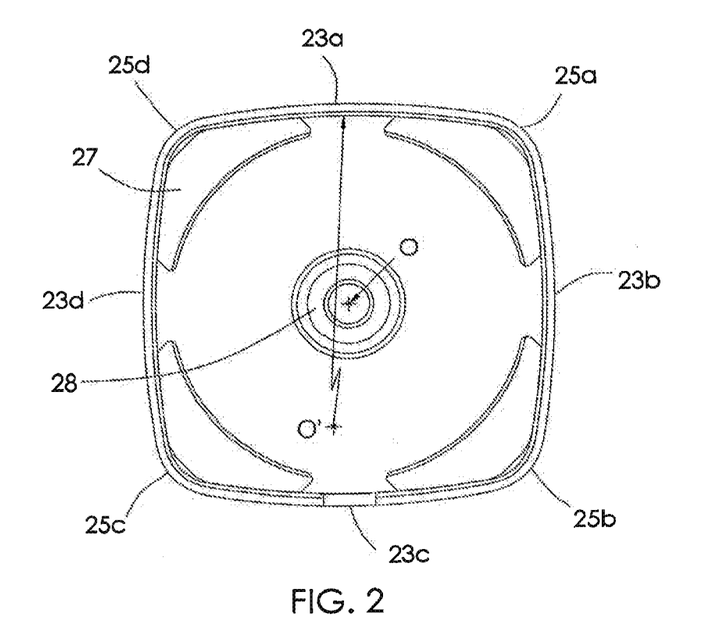
FIG. 2 shows a stator of the motor of FIG. 1.

As shown in FIG. 1 to FIG. 4, the PMDC 20 according to the first preferred embodiment comprises a stator and a rotor rotatably mounted to the stator. A radial cross section of the stator is illustrated in FIG. 2. The stator comprises a housing 21, an end cap 31 mounted to one end of the housing 21, and permanent magnets 27 fixed to inner surfaces of the housing 21. The rotor comprises a shaft 29, a commutator 22a, a rotor core 22b fixed onto the shaft 29 and rotor windings 22c wound about the rotor core and terminated on the commutator. The shaft 29 is rotatably supported by bearings 28 mounted to the end cap 31 and the housing 21. The end cap bearing is disposed within a bearing boss or bearing retainer 36.

The housing 21 comprises four side portions 23a~23d and four connecting portions 25a~25d distributed alternately along the circumferential direction of the motor. Adjacent side portions are connected by a corresponding connecting portion. The magnets 27 are fixed to an inner surface of respective connecting portions 25a~25d, preferably conforming with the adjoining side portions 23a~23d. In the radial cross section, each of the side portions 23a~23d is a convex curved line, which is convex outwardly with respect to a straight line that passes though respective ends of the curved line. In this embodiment, the convex curved line is an arc having a radius extending from a center O'. The center O' is offset from the rotational center O of the rotor.

Figure 3:
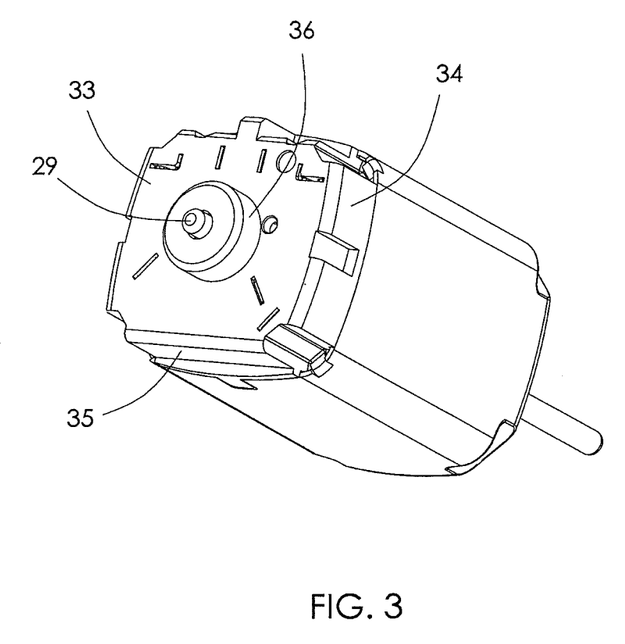
FIG. 3 shows another view of the motor of FIG. 1.

As shown in FIGS. 1 & 3, the end cap 31 comprises a bottom 33 and four side walls 34 that extend axially from the edge of the bottom 33. A flat mounting surface 35 is formed in a first side wall 34. The flat mounting surface 35 is parallel to the plane that contains the two axial edges of the first side wall 34. The flat mounting surface 35 may be formed by a part of or substantially the entire outer surface of the first side wall 34. The bearing retainer 36 is formed like a boss at the center of the end cap 31 and has a through hole for the rotor shaft. The rotor shaft 29 is rotatably supported by the bearing 28 accommodated within the bearing retainer 36.

Figure 4:
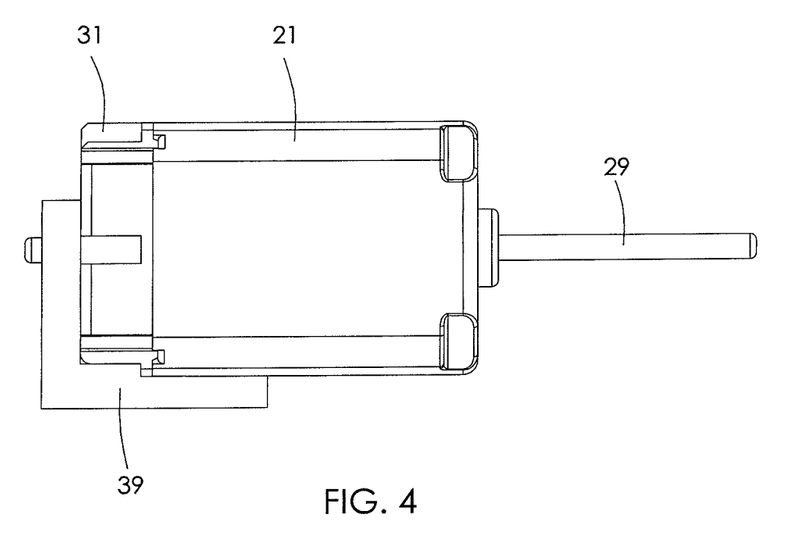
FIG. 4 illustrates how the motor of FIG. 1 is mounted.

As shown in FIG. 4, a motor mount 39 comprises a horizontal portion and a vertical portion. The vertical portion engages the boss-like bearing retainer 36. The horizontal portion comprises a flat surface for engaging the flat mounting surface 35 of the end cap 31. In other words, this motor has high power density and low noise due to the curved side portions and the flat mounting surface 35 makes it easy to install. The larger the size of the flat mounting surface 35, the more stable the motor should be.

Figure 5:
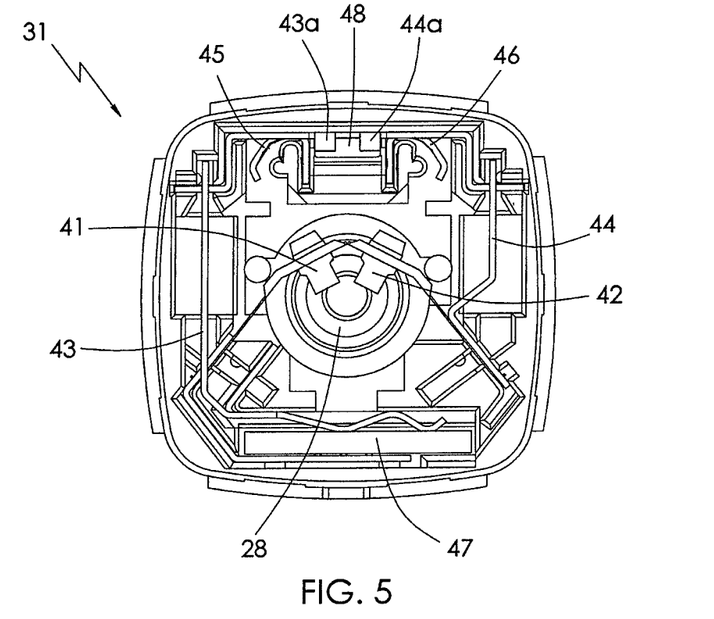
FIG. 5 and FIG. 6 show the end cap of the motor of FIG. 1.
Figure 6:
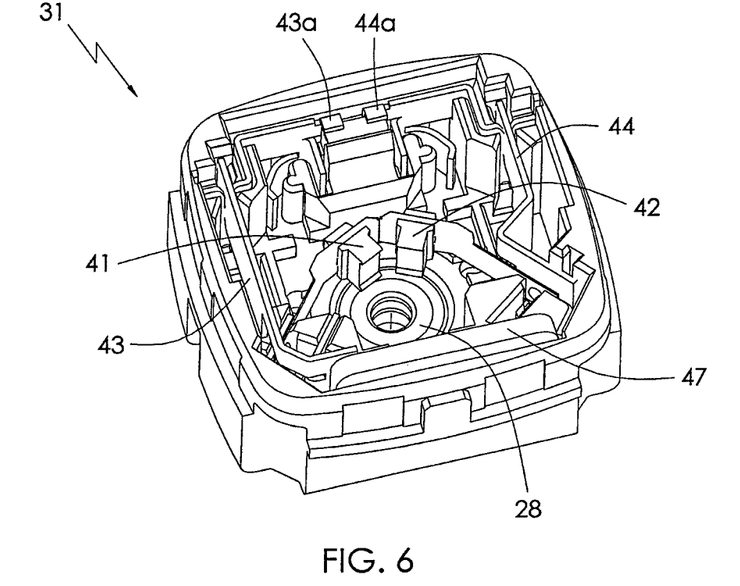

As shown in FIG. 5 and FIG. 6, two brushes 41 and 42, a thermistor 47 such as a Positive Temperature Coefficient (PTC) resistor, a chip capacitor 48 and two terminals 45 and 46 are mounted inside the end cap 31. The thermistor 47 is electrically connected in series between the first terminal 45 and the first brush 41. Specifically, the first terminal 45 is electrically connected to the thermistor 47 by a strip-like conductor 43 such as a copper strip. The first brush 41 is electrically connected to the thermistor 47 by the brush leaf and brush holder of the first brush 41. Similarly, the second terminal 46 is electrically connected to the second brush 42 by a strip-like conductor 44 and the brush leaf and brush holder of the second brush 42. The terminals 45 and 46 are used to connect to an external power supply. The two brushes 41 and 42 are urged by respect resilient brush leaves into sliding contact with a commutator for feeding current to windings of the rotor. The thermistor 47 provide over current protection for the motor. Two contacts of the chip capacitor 48 are electrically connected to respective terminals 45, 46 for reducing electrical noise. Fingers 43a and 44a are integrally formed with the terminals 45 and 46 respectively for preventing the capacitor 48 moving out of its slot in the end cap 31.

Figure 7:
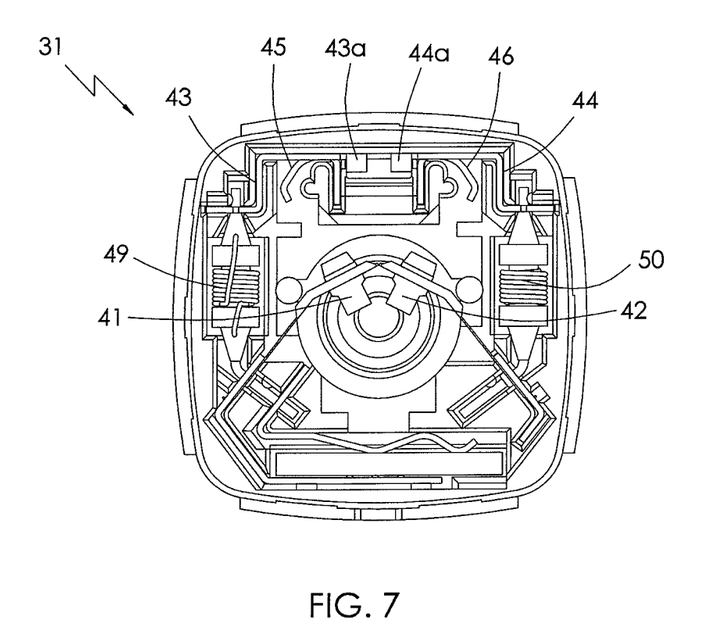
FIG. 7 and FIG. 8 illustrate the end cap of a PMDC motor according to a second embodiment of the present invention.
Figure 8:
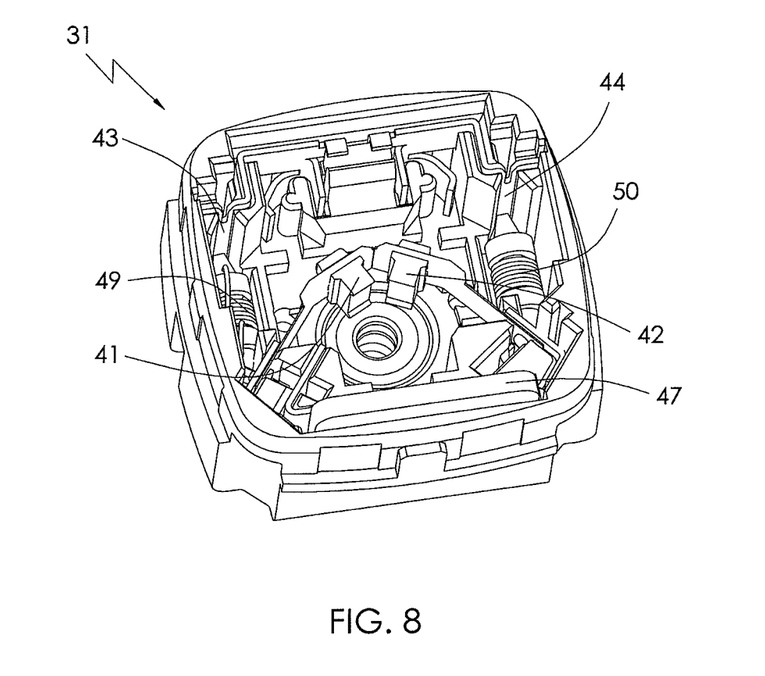

An end cap according to a second embodiment as shown in FIG. 7 and FIG. 8, further comprises two chokes 49 and 50. The first choke 49 is electrically connected in series between the first terminal 45 and the thermistor 47. The second choke 50 is electrically connected in series between the second terminal 46 and the second brush 42 by the conductor 44 and the brush holder and brush leaf of the second brush 42. The end cap 31 has better EMI (Electro-Magnetic Interference) suppression due to the addition of the two chokes.

Figure 9:
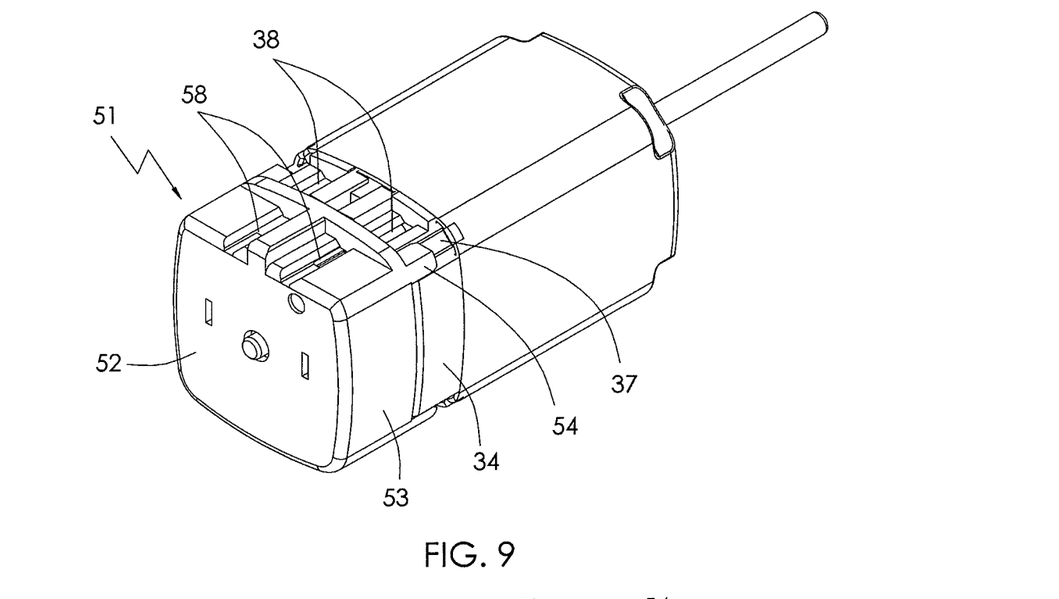
FIG. 9 shows a PMDC motor according to a third embodiment of the present invention.
Figure 10:
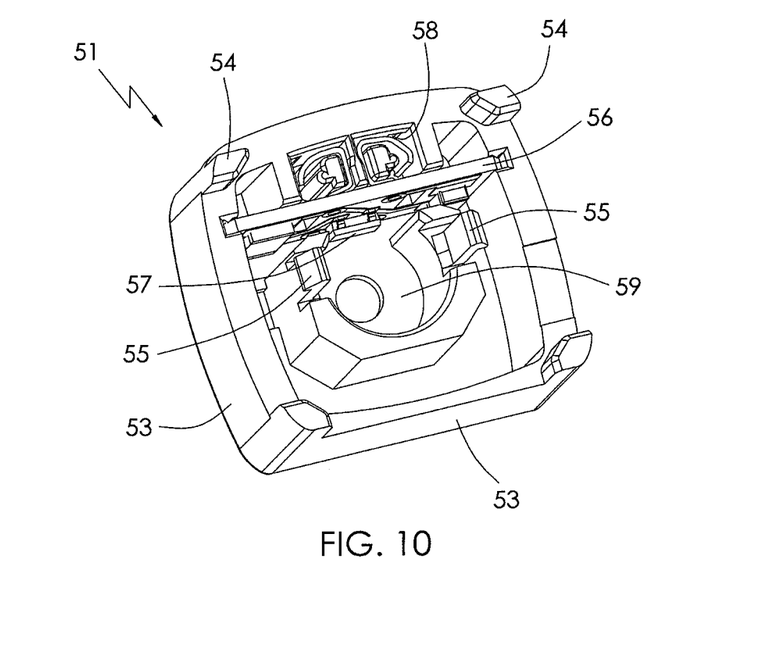
FIG. 10 shows an inner structure of an end cap cover, being a part of the motor of FIG. 9.
Figure 11:
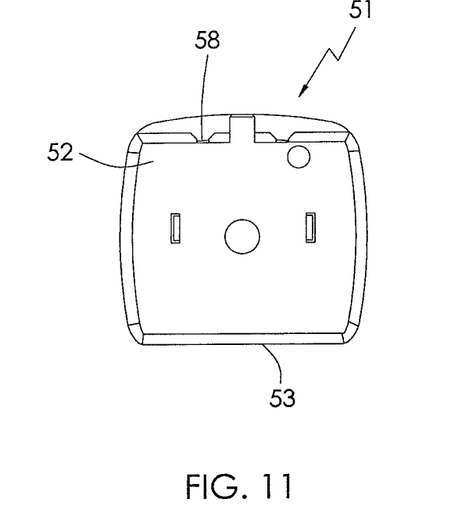
FIG. 11 is an end view of the end cap cover of FIG. 10.
Figure 12:
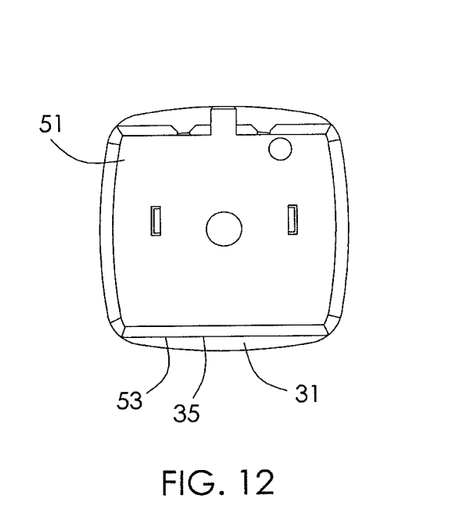
FIG. 12 is an end view of the assembled end cap cover and end cap.
Figure 13:
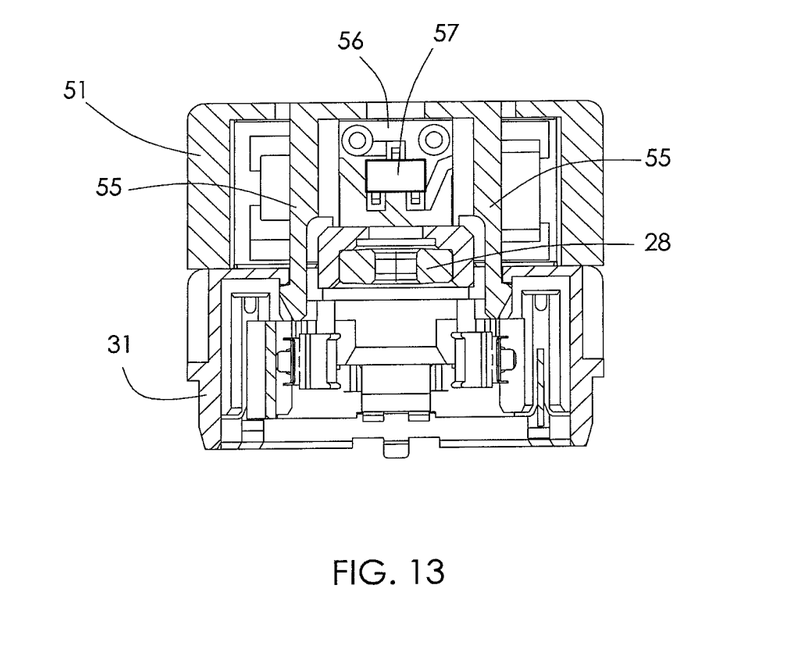
FIG. 13 is a longitudinal sectional view of the assembled end cap cover and end cap of FIG. 12.
Figure 14:
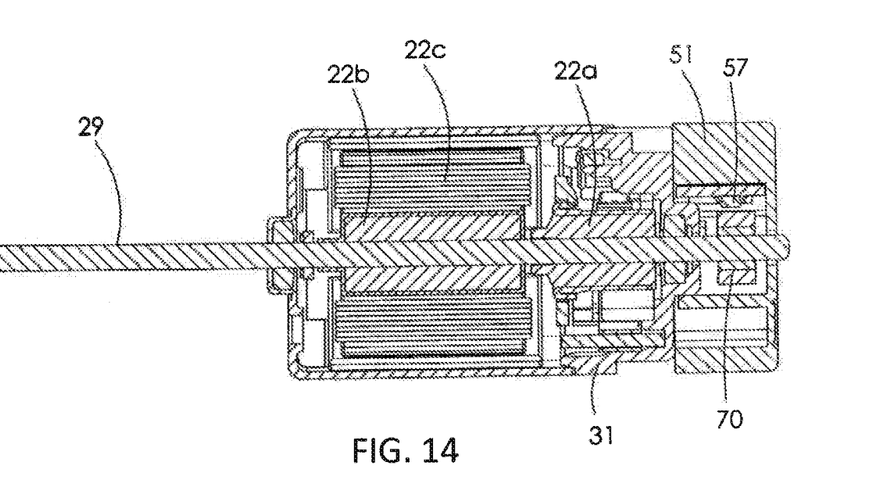
FIG. 14 is a sectional view of the motor of FIG. 9.

Another motor according to a third embodiment of the present invention is illustrated in FIG. 9. This motor further comprises an end cap cover 51 that is mounted to the end cap 31 in the axial direction, to provide additional functions. FIG. 10 illustrates the cup-shaped cover 51 and FIG. 11 is an end view of the cover 51. FIG. 12 is an end view of the assembled cover 51 and end cap 31 and FIG. 13 is a longitudinal sectional view of the assembled cover 51 and end cap 31. FIG. 14 is a sectional view of the motor of FIG. 9.

The cup-shaped cover 51 comprises a bottom 52 and four side walls 53 extending axially from the edge of the bottom 52. One of the side walls 53 is substantially flat and is aligned with the flat mounting surface 35 of the cover 31 (FIG. 12). Four legs 54 are integrally formed with the cover 51 and extend axially from respective corners of the cover 51. As shown in FIG. 9, four guiding grooves 37 are formed at the corners of the end cap 31 for frictionally receiving the four legs 54 to guide the mounting of the cover 51 to the end cap 31 in the axially direction. Two resilient snap-in fingers 55 are integrally formed with the cover 51 and extend axially into recesses formed in the end cap for locking the cover 51 to the end cap 31.

In this embodiment, the cover 51 is mainly for Hall effect functions, such as speed control, rotation detection, position detection, etc. A position magnet 70, preferably a ring magnet, is fixed onto the rotor shaft 29 and rotates with the shaft 29. A chamber 59 is formed in the cover 51 between the two resilient fingers 55 for receiving the position magnet 70. A printed circuit board (PCB) 56 is mounted inside the cover 51, and Hall sensor(s) 57 are mounted to the PCB 56 for detecting the magnetic field of the position magnet 70. As can be seen in FIG. 9, the cover 51 comprises slots 58 formed in one of the side walls 53. Connectors for the power supply lines and signal lines of the PCB 56 and Hall sensors 57 can pass through the slots 58. Similarly, the end cap 31 also comprises slots 38 formed in one of the side walls 34 to allow external connectors to plug-in to the motor to supply power to the motor. In this embodiment, the slots 58 and 38 are formed in side walls that are opposite to the flat mounting surface 35 of the end cap, but it is not essential. For example, the slots 38 may be formed in a side wall 34 that is adjacent to or adjoining the flat mounting surface 35 rather than opposite to the flat mounting surface 35.

Figure 15:
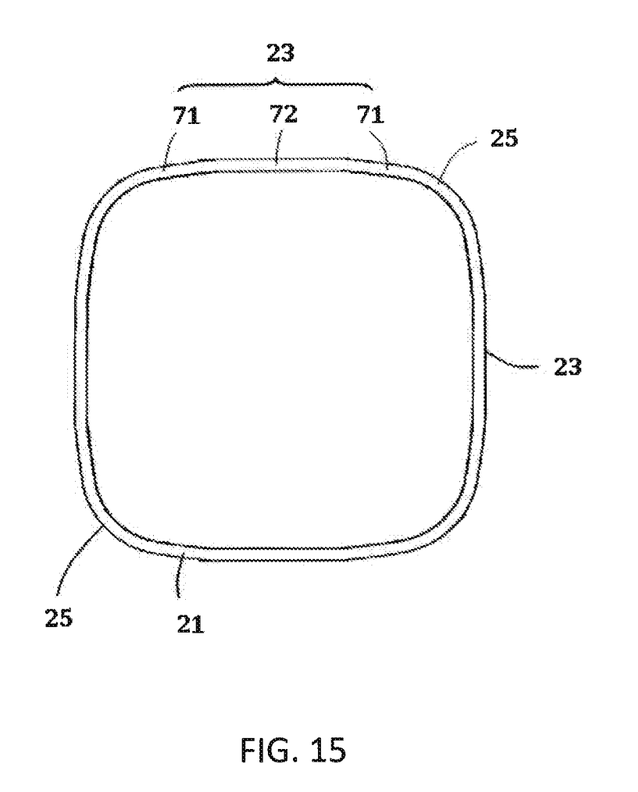
FIG. 15 illustrates the housing of the PMDC motor according to a fourth embodiment of the present invention

In the embodiments mentioned above, the radial cross section of each side portion of the motor housing 21 is a convex curved line formed as one arc. However, the radial cross section of each side portion may be formed by one more arc segments, or one more straight line segments, or the combination thereof. For example, FIG. 15 illustrates another housing 21 according to a fourth embodiment of the present invention. The housing 21 includes four convex side portions 23 and four connecting portions 25 distributed alternately. The housing 21 differs from the housing of the first embodiment shown in FIG. 2 in that the radial cross section of each side portion 23 includes two arc segments 71 and a straight line 72 therebetween.

This invention is applicable to a motor whose housing comprises n side portions and n connecting portions, wherein n is an integral number equal to or greater than 3. Preferably, n is an even number greater than 3.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet motor comprising a stator and a rotor rotatably mounted to the stator,
the stator comprising a substantially polygonal housing having n convex side portions and n connecting portions distributed alternately, wherein the connecting portions are arranged at corners of the housing, n is an integer equal to or greater than 3, adjacent convex side portions are connected by a respective one of the connecting portions, each of said n convex side portions has a convex outer surface and a convex inner surface, the radial cross section of each convex side portion is convex outwardly relative to a straight line passing through two circumferential ends of the convex side portion;
a plurality of permanent magnets fixed to an inner surface of the housing, each of the permanent magnets being in proximity to one of said n connecting portions; and
an end cap mounted to one end of the housing, the end cap comprising a bottom and n convex side walls extending from edges of the bottom and corresponding to said n convex side portions of the housing, wherein one flat mounting surface facing radially is formed at the outer surface of a first one of said n convex side walls of the end cap and located outside the housing when the end cap is mounted to the housing.

2. The motor of claim 1, wherein a part of the outer surface of the first side wall of said end cap forms the flat mounting surface and the flat mounting surface is substantially parallel to the plane containing two axial edges of the first side wall of said end cap.

3. The motor of claim 1, wherein the radial cross section of each convex side portion comprises two arc segments spaced from each other and one straight line segment connected between the two arc segments.

4. The motor of claim 1, wherein n is 4.

5. The motor of claim 1, wherein:
the rotor comprises a shaft, a commutator, a rotor core fixed onto the shaft and rotor windings wound about the rotor core; and
the end cap supports a first brush and a second brush for sliding contact with the commutator, a first terminal and a second terminal for connecting to a power supply and electrically connected to respective brushes, and a thermistor electrically connected in series between the first brush and the first terminal for over current protection.

6. The motor of claim 5, wherein the end cap supports a chip capacitor electrically connected to the first terminal and the second terminal.

7. The motor of claim 5, wherein the end cap supports a first choke and a second choke, the first choke being electrically connected in series with the first brush, the thermistor and the first terminal, the second choke being electrically connected in series with the second brush and the second terminal.

8. The motor of claim 5, wherein the motor comprises a cup-shaped cover mounted to the end cap in the axial direction of the motor.

9. The motor of claim 8, wherein the cover comprises a bottom and n−1 convex side walls extending from edges of the bottom and a flat side wall having a radially outer flat mounting surface, the flat mounting surface of the cover is aligned and coplanar with the flat mounting surface of the end cap.

10. The motor of claim 8, wherein the motor comprises a printed circuit board mounted inside the cover.

11. The motor of claim 8, wherein the motor comprise a position magnet fixed onto the shaft, the position magnet being outside the end cap and received in the cover; the motor comprises at least one Hall sensor received in the cover for detecting the magnetic field of the position magnet.

12. The motor of claim 10, wherein the motor comprise a position magnet fixed onto the shaft, the position magnet being outside the end cap and received in the cover; the motor comprises at least one Hall sensor mounted to the printed circuit board for detecting the magnetic field of the position magnet.

13. The motor of claim 8, wherein the cover is fixed to the end cap by resilient fingers integrally formed as a monolithic part of the cover and disposed in recesses in the end cap.

14. The motor of claim 1, wherein the radial cross section of each convex side portion is an arc having a radius extending from a center that is offset from the rotational center of the rotor.

15. The motor of claim 1, wherein each of the two circumferential ends of the radial cross section of each convex side portion has a curvature different from a curvature of the radial cross section of each of said n connecting portions.

16. The motor of claim 1, wherein each permanent magnet has two circumferential ends with radial outer surfaces mating with the inner surface of the housing at adjacent two convex side portions.

17. The motor of claim 1, wherein said end cap has the first one of the side walls as only one flat mounting surface.

18. The motor of claim 1, wherein each of said n convex side portions of side housing has a constant thickness.

19. A permanent magnet motor comprising a stator and a rotor rotatably mounted to the stator,
the stator comprising a housing having four convex side portions and four connecting portions distributed alternately, the connecting portions being arranged at corners of the housing, adjacent convex side portions being connected by a respective one of the connecting portions, each of the convex side portions having a convex outer surface and a convex inner surface;
a plurality of permanent magnets fixed to an inner surface of the housing, each of the permanent magnets being in proximity to one of the four connecting portions; and
an end cap mounted to one end of the housing, the end cap comprising a bottom and four side walls extending from edges of the bottom and corresponding to the four convex side portions of the housing, each of the four side walls having a free end being convex radially and outwardly, wherein one flat mounting surface facing radially is formed at an outer surface of a first one of the four side walls of the end cap outside the housing.

\* \* \* \* \*